US008610942B2

(12) United States Patent
Eguchi

(10) Patent No.: US 8,610,942 B2
(45) Date of Patent: Dec. 17, 2013

(54) DISCARD CERTIFICATION OUTPUT DEVICE, METHOD FOR OUTPUTTING DISCARD CERTIFICATE AND COMPUTER READABLE MEDIUM

(75) Inventor: Hiroyuki Eguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1414 days.

(21) Appl. No.: 11/882,201

(22) Filed: Jul. 31, 2007

(65) Prior Publication Data

US 2008/0106763 A1 May 8, 2008

(30) Foreign Application Priority Data

Nov. 7, 2006 (JP) ................................ 2006-301151

(51) Int. Cl.
*G06F 15/00* (2006.01)
*G06F 12/14* (2006.01)

(52) U.S. Cl.
USPC ....... 358/1.18; 358/1.14; 713/156; 241/101.2

(58) Field of Classification Search
None
See application file for complete search history.

(56) References Cited

U.S. PATENT DOCUMENTS

| | | | | |
|---|---|---|---|---|
| 2004/0188512 | A1 * | 9/2004 | Ikeda | 235/375 |
| 2005/0237563 | A1 * | 10/2005 | Yoshiura et al. | 358/1.14 |
| 2007/0057099 | A1 * | 3/2007 | Kubo et al. | 241/101.2 |
| 2007/0063082 | A1 * | 3/2007 | Coleman | 241/101.2 |

FOREIGN PATENT DOCUMENTS

| | | |
|---|---|---|
| JP | A-2003-34436 | 2/2003 |
| JP | A-2005-107973 | 4/2005 |
| JP | A 2005-190365 | 7/2005 |
| JP | A-2006-31135 | 2/2006 |
| JP | A-2006-301778 | 11/2006 |

OTHER PUBLICATIONS

Mar. 24, 2011 Office Action issued in Japanese Patent Application No. 2006-301151 (with translation).

* cited by examiner

*Primary Examiner* — Gabriel I Garcia
*Assistant Examiner* — Pawandeep Dhingra
(74) *Attorney, Agent, or Firm* — Oliff & Berridge, PLC

(57) ABSTRACT

A discard certification output device is installed in one of a document generation apparatus generating a document, a document discard apparatus discarding the document, and a server connected to the document generation apparatus and document discard apparatus, the discard certification output device including: a discard information acquisition unit that acquires information concerning a document discard in the document discard apparatus; and a discard certification output unit that converts the information acquired by the discard information acquisition unit into a visible image in a predetermined format and outputs the visible image as discard certification.

8 Claims, 9 Drawing Sheets

FIG. 4

| | | | |
|---|---|---|---|
| DISCARD CERTIFICATION ATTRIBUTE | DOCUMENT NAME | TITLE | |
| | | SUBTITLE | |
| | DOCUMENT TYPE | CONTRACT | |
| | | BUSINESS FORM | |
| | | SPECIFICATION | |
| | | ... | |
| | USER NAME | REQUESTER | |
| | | APPROVER | |
| | | DISPOSER | |
| | | CREATOR | |
| | OWNERSHIP PROPERTY | INDIVIDUAL | |
| | | COMPANY | COMPANY NAME |
| | | | DEPARTMENT NAME |
| | | | GROUP NAME |
| | DATE AND TIME | REQUEST DATE | |
| | | APPROVAL DATE | |
| | | DISCARD DATE | |
| | | CREATION DATE | |
| | | EXPIRATION DATE | |
| | PROCESSING APPARATUS | DISCARD APPARATUS | |
| | | DISCARD CERTIFICATION ISSUING APPARATUS | |
| | | GENERATION APPARATUS | |
| | HANDLING METHOD | PULVERIZATION | |
| | | INCINERATION | |
| | | COMPRESSION | |
| | | RECLAMATION | |
| | | MELTING | |
| | SIGNATURE | REGISTERED SEAL | |
| | | PRIVATE SEAL | |
| | | COMPANY SEAL | |
| | | DATA SEAL | |
| | | ELECTRONIC SIGNATURE | |

FIG. 8

DISCARD CERTIFICATE LIST

DISCARD CERTIFICATION LIST IS AS FOLLOW

| | DOCUMENT NAME | DISCARD DATE AND TIME | DISCARDER | DISCARD APPARATUS |
|---|---|---|---|---|
| | ×○□1 | 2006/03/20 10:05 | FUJI TARO | Trust Eco It (192.168.0.1) |
| | ×○□2 | 2006/03/20 10:05 | FUJI TARO | Trust Eco It (192.168.0.1) |
| √ | ×○□3 | 2006/03/20 10:05 | FUJI TARO | Trust Eco It (192.168.0.1) |
| | □△1 | 2006/03/20 10:05 | FUJI TARO | Trust Eco It (192.168.0.1) |
| | □△2 | 2006/03/20 10:05 | FUJI TARO | Trust Eco It (192.168.0.1) |
| | □△3 | 2006/03/20 10:05 | FUJI TARO | Trust Eco It (192.168.0.1) |
| | ※×○□1 | 2006/03/20 10:05 | FUJI TARO | Trust Eco It (192.168.0.1) |
| | ※×○□2 | 2006/03/20 10:05 | FUJI TARO | Trust Eco It (192.168.0.1) |
| | ※×○□3 | 2006/03/20 10:05 | FUJI TARO | Trust Eco It (192.168.0.1) |
| | ※×○□4 | 2006/03/20 10:05 | FUJI TARO | Trust Eco It (192.168.0.1) |
| | ※×○□5 | 2006/03/20 10:05 | FUJI TARO | Trust Eco It (192.168.0.1) |
| | ※×○□6 | 2006/03/20 10:05 | FUJI TARO | Trust Eco It (192.168.0.1) |
| | ※×○□7 | 2006/03/20 10:05 | FUJI TARO | Trust Eco It (192.168.0.1) |
| | ※×○□8 | 2006/03/20 10:05 | FUJI TARO | Trust Eco It (192.168.0.1) |
| | ※×○□9 | 2006/03/20 10:05 | FUJI TARO | Trust Eco It (192.168.0.1) |

2006/03/24 16:30
TOKYOUTO MINATOKU XXX
NIHON HAIKI RECYCLE KABUSHIKIKAISHA

COMPANY SEAL

DISCARD CERTIFICATION OUTPUT DEVICE, METHOD FOR OUTPUTTING DISCARD CERTIFICATE AND COMPUTER READABLE MEDIUM

CROSS-REFERENCE TO RELATED APPLICATIONS

This application is based on and claims priority under 35 U.S.C. 119 from Japanese Patent Application No. 2006-301151 filed Nov. 7, 2006.

BACKGROUND

1. Technical Field

This invention relates to a discard certification output device, to a method for outputting a discard certificate, and to a computer readable medium for certifying discard in a system for disposing of a paper document (simply "document").

2. Related Art

If a document having confidentiality becomes an already used document, it is a common practice to shred the document in an unreproducible state using a shredder, etc., for discard. Hitherto, for document discard, an art for not only disposing of a document, but also managing the discard in association with generation of the document has been proposed.

SUMMARY

According to an aspect of the present invention, a discard certification output device which is installed in one of a document generation apparatus generating a document, a document discard apparatus discarding the document, and a server connected to the document generation apparatus and document discard apparatus, the discard certification output device including: a discard information acquisition unit that acquires information concerning a document discard in the document discard apparatus; and a discard certification output unit that converts the information acquired by the discard information acquisition unit into a visible image in a predetermined format and outputs the visible image as discard certification.

BRIEF DESCRIPTION OF THE DRAWINGS

Exemplary embodiment of the present invention will be described in detail based on the following figures, wherein:

FIG. 4 is a schematic representation to show an example of information concerning the attributes certifying discard, stored and managed by the server in the document discard certification system in FIG. 1;

FIG. 6 is a flowchart to show a processing operation example in the document discard certification apparatus according to the exemplary embodiment of the invention and a processing operation example when a document is disposed of;

FIG. 8 is a schematic representation to show a specific example of a discard certification list.

DETAILED DESCRIPTION

A discard certification output unit and a discard certification output program according to an exemplary embodiment of the invention will be discussed below:

First, before description of the discard certification output unit and the discard certification output program according to the exemplary embodiment of the invention, the whole of a document discard certification system including the discard certification output unit and the discard certification output program will be discussed.

Figure 1:
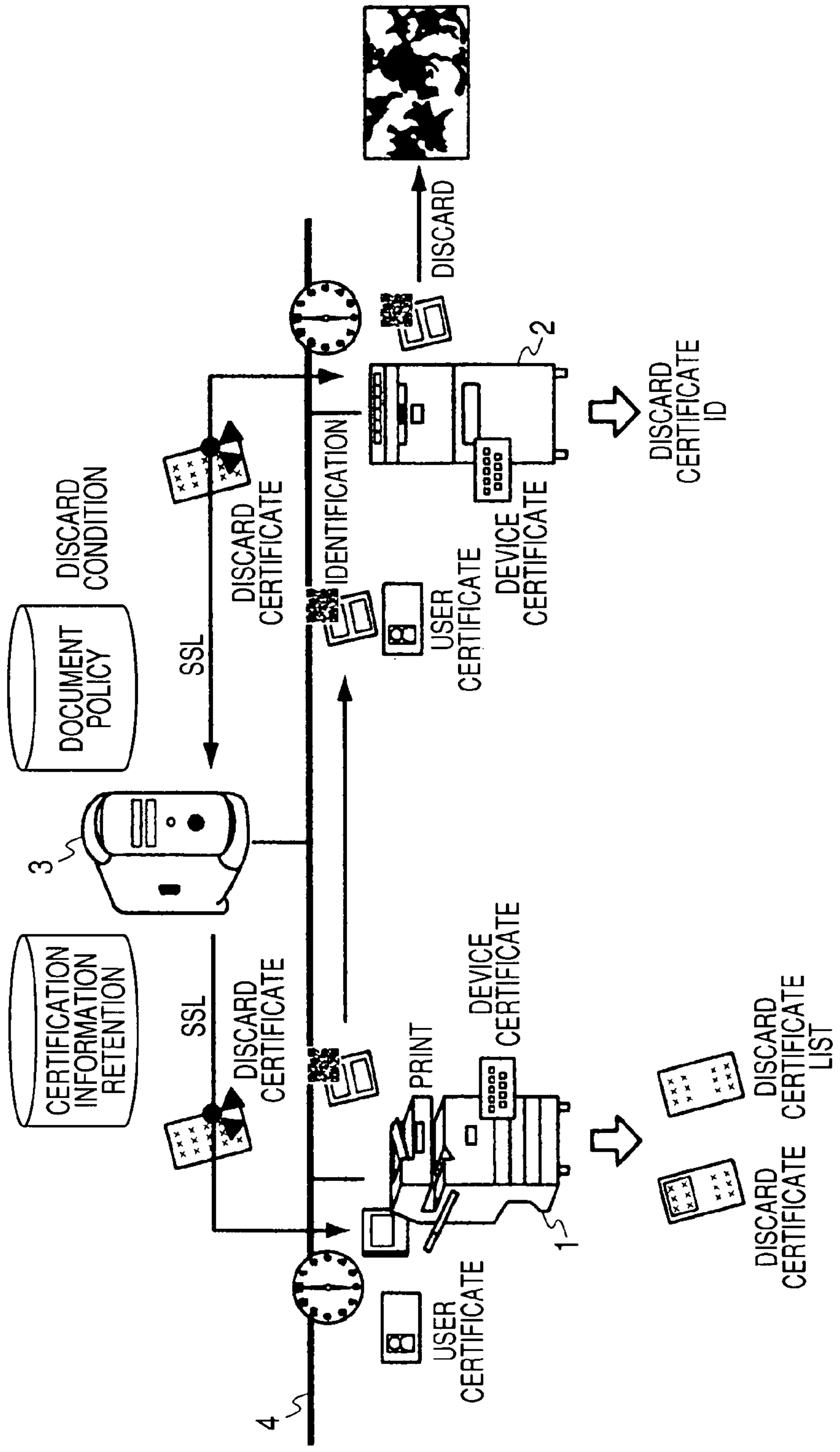
FIG. 1 is a schematic representation to show one configuration example of a document discard certification system.

FIG. 1 is a schematic representation to show one configuration example of the document discard certification system. The document discard certification system illustrated in the figure is made up of a document generation apparatus 1, a document discard apparatus 2, a server 3, and a communication line 4 for connecting the components.

The document generation apparatus 1 is implemented as a copier, a printer, a multifunction processing machine integrating their functions, etc., for printing out document data to generate a document. It is assumed that the document generation apparatus 1 includes a function of giving a unique document ID in the system to the generated document and a function of a computer made up of a CPU (Central Processing Unit), RAM (Random Access Memory), ROM (Read-Only Memory), etc., as well as the document generation function.

On the other hand, the document discard apparatus 2 is implemented as a shredder, for example, for disposing of a document by shredding the document in an unreproducible state. It is assumed that the document discard apparatus 2 includes a function of executing image read from the document to be disposed of and a function of a computer made up of a CPU, RAM, ROM, etc., as well as the document discard function.

Each of the document generation apparatus 1 and the document discard apparatus 2 previously retains a digital certificate issued by a reliable certificate authority to certify identification of the apparatus. As the specifications of the digital certificate, for example, those defined in ITU (International Telecommunication Union)-T X.509 can be used.

Each of the document generation apparatus 1 and the document discard apparatus 2 includes a function of authenticating identification of the user of the apparatus. To authenticate identification of the user, the IC card, the USB key, etc., owned by the user can be used.

It is assumed that each of the document generation apparatus 1 and the document discard apparatus 2 further includes a function of acquiring time information via the communication line 4 from an external time stamp server. The time stamp server is a known server and therefore will not be discussed here. The apparatus may contain a clock for provision for the case where time information cannot be acquired from the time stamp server.

The server 3 connected to the document generation apparatus 1 and the document discard apparatus 2 is implemented as a machine including the function of a computer made up of a CPU, RAM, ROM, etc., namely, as a computer for performing information processing, information storage, etc., and is placed mainly for conducting document management in the system. Thus, the server 3 has functions of storing and managing various pieces of information described later in detail.

The server 3 is not an indispensable component. That is, for example, if at least either the document generation apparatus 1 or the document discard apparatus 2 includes the function of the server 3, the server 3 need not necessarily be provided in the system.

The communication line 4 for connecting the document generation apparatus 1, the document discard apparatus 2, and the server 3 may be wire or wireless and may be a communication line to construct a wide-area network using a public switched network, etc., or a communication line to construct a local area network if it enables information transfer among the document generation apparatus 1, the document discard apparatus 2, and the server 3. However, it is desirable that SSL (Secure Socket Layer) encryption should be adopted on the communication line 4 to prevent leakage of communicated information.

Next, a basic processing operation example in the described document discard certification system will be discussed.

First, a processing operation example for the document discard apparatus 2 to dispose of a document will be discussed. The document discard apparatus 2 disposes of a document generated in the document generation apparatus 1. However, it is assumed that when the document is generated in the document generation apparatus 1, a unique document ID in the system is given to the document and is embedded in the document as a two-dimensional code such as QR code (registered trademark). The document ID may be generated and embedded using a known technology. The document ID may be embedded as any other information (for example, text information) rather than the two-dimensional code or may be embedded using an IC tag such as RFID (Radio Frequency Identification).

It is also assumed that information concerning the discard condition of each document to be disposed of by the document discard apparatus 2, namely, information for determining whether or not the document can be disposed of (for example, expiration date information of the document) is stored and managed in the server 3 in association with the document ID of the document.

Figure 2:
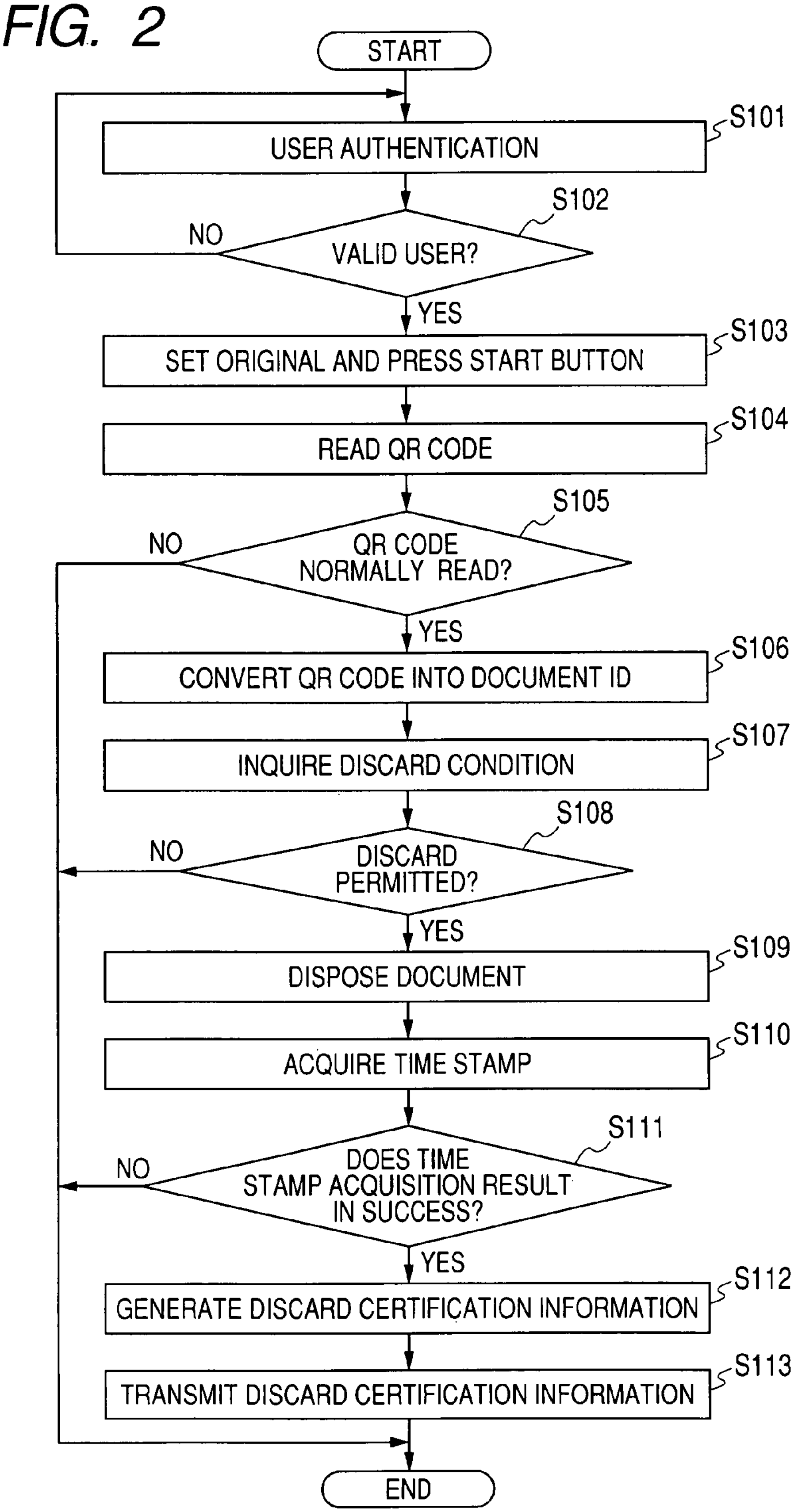
FIG. 2 is a flowchart to show a processing operation example when a document is disposed of in a document discard apparatus in the document discard certification system in FIG. 1.

FIG. 2 is a flowchart to show a processing operation example for the document discard apparatus 2 to dispose of a document. As illustrated in the figure, when a document is disposed of, the document discard apparatus 2 conducts user authentication using an IC card or a USB key where the digital certificate of the user is stored by the user (step 101 (S101)). Here, the user authentication information may be managed locally or user information may be inquired of an LDAP (Lightweight Directory Access Protocol) server for authentication.

If the user is valid (S102) as a result of the user authentication, when the user sets the document to be disposed of and presses a start button (S103), the document discard apparatus 2 executes image read from the document and reads the two-dimensional code added to the document (S104). As a result, if the two-dimensional code can be read correctly (S105), the document discard apparatus 2 converts it into a document ID of the document to be disposed of based on the read result (S106). When thus acquiring the document ID of the document to be disposed of, the document discard apparatus 2 inquires the discard condition of the document, namely, inquires of the server 3 whether or not the document can be disposed of using the document ID as a key (S107) The server 3 makes an answer to the inquiry as to whether or not the document can be disposed of based on the information stored and managed by the server 3.

As a result, if the answer indicates that the document cannot be disposed of or no answer is gotten for some reason (for example, communication error occurrence), the document is not disposed of; if the answer indicates that the document can be disposed of (S108), the document discard apparatus 2 shreds the setup document to be disposed of to dispose of the document (S109) and acquires time stamp information as time certification about the termination time of the document discard processing from the time stamp server (S110) If acquisition of the time stamp information results in success (S111), the document discard apparatus 2 generates document discard certification information of information confirming that the printout document is reliably disposed of based on digital certificate about the document discard apparatus 2 retained by the document discard apparatus 2, user authentication information obtained by user authentication at the processing start time, and the time stamp information at the document discard termination time (S112) and transmits the document discard certification information to the server 3 (S113).

If the document discard apparatus 2 thus generates the document discard certification information, it is made possible to determine "who" disposed of the document disposed of by the document discard apparatus 2 "when" and "where" based on the document discard certification information. Moreover, the document discard certification information is generated based on the user authentication information by the document discard apparatus 2, the information concerning the digital certificate retained by the document discard apparatus 2, and the time stamp information acquired by the document discard apparatus 2 and more specifically contains the digital certification information of the user ID certified by the digital certificate of the user, the machine ID certified by the digital certificate of the document discard apparatus 2, the time stamp information certified by the time stamp server, etc., and therefore becomes highly reliable. The document discard certification information is signed using a secret key of the digital certificate of the user, the digital certificate of the document discard apparatus 2, etc., or is encrypted using a public key, whereby tampering, information leakage, etc., can also be prevented.

Figure 3:
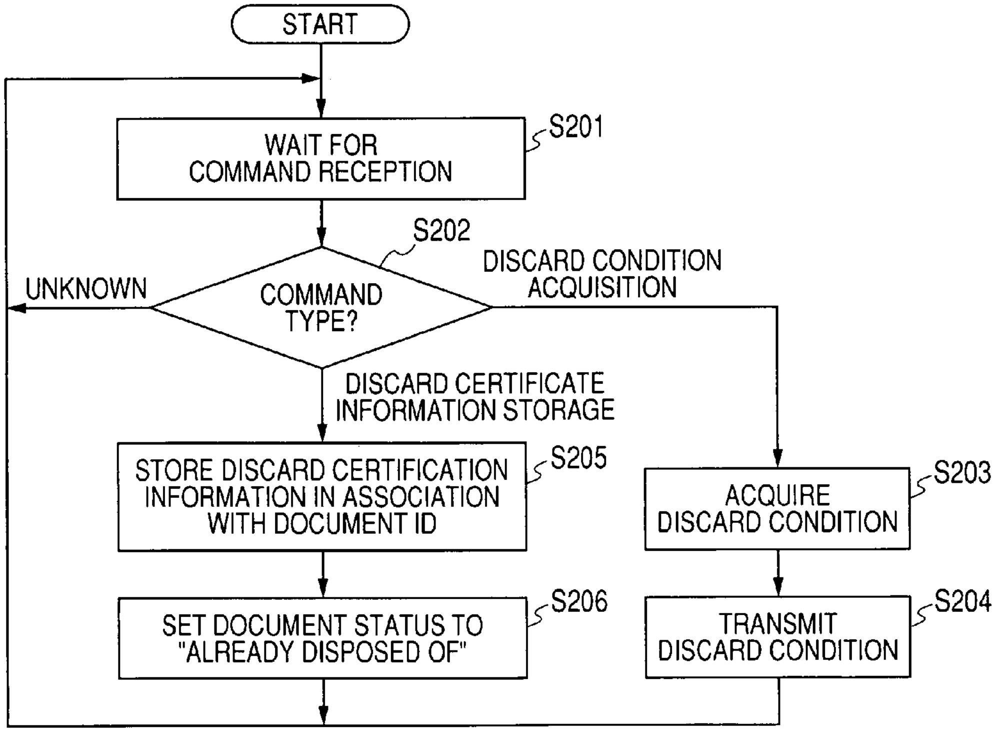
FIG. 3 is a flowchart to show the processing operation in a server in the document discard certification system in FIG. 1.

Subsequently, a processing operation example in the server 3 will be discussed. FIG. 3 is a flowchart to show the processing operation in the server 3. As illustrated in the figure, the server 3 always monitors the presence or absence of a command transmitted to the server 3 through the communication line 4 (S201). Upon reception of a command, the server 3 first recognizes the type of command (S202). The type can be recognized based on attribute information contained in the command.

If the received command is transmitted from the document discard apparatus 2 and is a command forsaking a request for sending the discard condition about the document to be disposed of by the document discard apparatus 2, namely, a command corresponding to an inquiry as to whether or not the document can be disposed of from the document discard apparatus 2, the server 3 recognizes the document ID determined by the command (the document ID of the document to be disposed of) and reads and acquires the information about the discard condition involved in the document ID (S203) and returns the acquisition result to the document discard apparatus 2 as an answer to the inquiry as to whether or not the document can be disposed of (S204).

If the received command is transmitted from the document discard apparatus 2 and is a command for requesting the server 3 to store the document discard certification information generated by the document discard apparatus 2 in a table, the server 3 receives the document discard certification information following the command and stores the received document discard certification information (S205) and sets the document status corresponding to the document ID to "already disposed of" (S206).

As the processing is performed, it is made possible in the server 3 to determine "who" disposed of the document disposed of by the document discard apparatus 2 "when" and "where" and also determine that the document is already disposed of.

That is, the server 3 stores and manages information concerning various attributes certifying discard of the document disposed of by the document discard apparatus 2. FIG. 4 is a schematic representation to show an example of the information concerning the attributes certifying discard, stored and managed by the server 3. The items shown as the attributes in the figure are shown only as a specific example and the attributes are not limited to them.

Next, the discard certification output unit used in the document discard certification system as described above will be discussed. Here, the case where the server 3 includes the function of the discard certification output unit is taken as an example.

Figure 5:
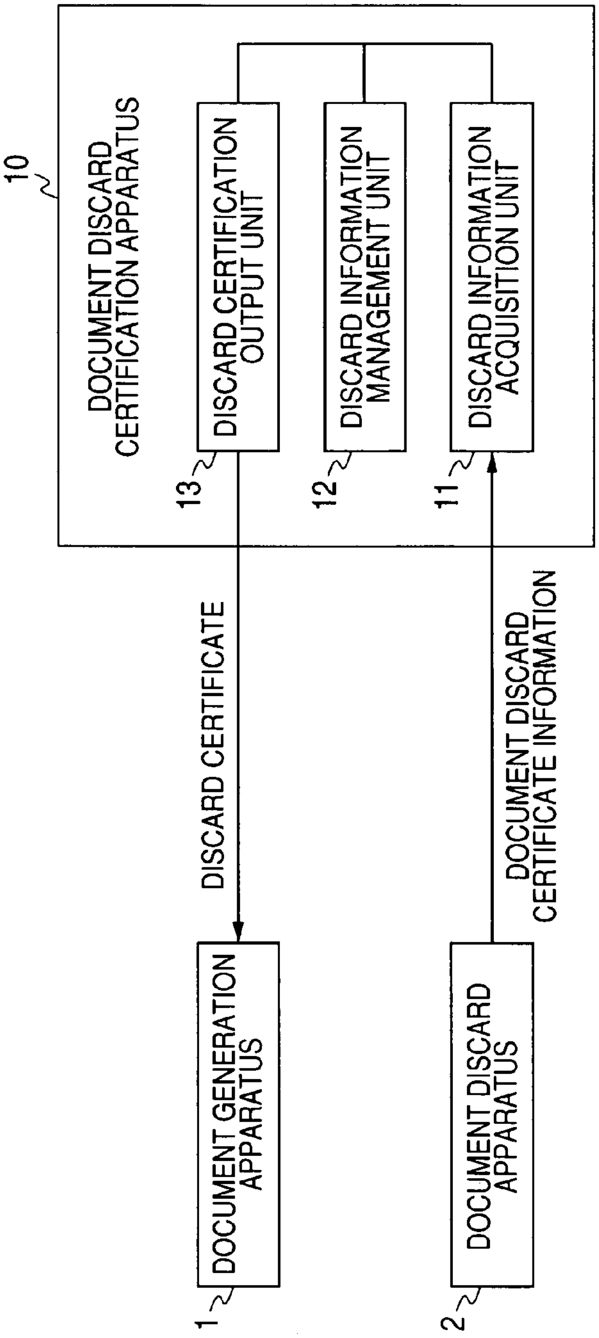
FIG. 5 is a block diagram to show a functional configuration example of a discard certification output unit according to the exemplary embodiment of the invention.

FIG. 5 is a block diagram to show a functional configuration example of the discard certification output unit according to the exemplary embodiment of the invention. As illustrated in the figure, a discard certification output unit 10 includes the functions of discard information acquisition unit 11, discard information management unit 12, and discard certification output unit 13.

The discard information acquisition unit 11 acquires information concerning document discard in the document discard apparatus 2. As the information concerning document discard, the above-mentioned document discard certification information, namely, the attributes certifying discard can be named (see FIG. 4).

When the discard information acquisition unit 11 acquires information concerning document discard, the discard information management unit 12 stores and manages the information. However, document discard in the document discard apparatus 2 is not necessarily conducted for each document and in recent years, a document group made up of a large amount of documents has been often disposed of collectively. That is, the discard information acquisition unit 11 can also acquire information at a time about the documents making up a document group. Thus, when the discard information acquisition unit 11 acquires information concerning document discard, the discard information management unit 12 gives identification information for discriminating one process of the document discard from another. Hereinafter, the identification information will be referred to as "discard certification ID." The discard certification ID may function as identification information and the format, the generation technique, etc., of the discard certification ID is not limited. When giving the discard certification ID, the discard information management unit 12 stores list information about the document group forming the processing unit determined by the discard certification ID and individual information for each document in the document group in association with each other. The list information is information for determining the document ID of each document in the document group. The individual information is document discard certification information by document. The technique, etc., of storage and management of the list information and the individual information is not limited either; for example, the list information and the individual information can be stored and managed in a table format.

The discard certification output unit 13 converts the information acquired by the discard information acquisition unit 11 and stored and managed by the discard information management unit 12 into a visible image in a predetermined format and outputs the visible image as a discard certificate. That is, using a preset model (image data, font data, etc.,) based on the list information and the individual information stored and managed by the discard information management unit 12, the discard certification output unit 13 generates data that can be output as discard certification (specifically, a discard certification list or discard certificate described later) and outputs the generated output data to the document generation apparatus 1, for example, via the communication line 4. It is considered that the generated output data is image data suited for printout onto record paper in the document generation apparatus 1, but the data format is not limited. The output data may be output to any other apparatus existing on the communication line 4, a user interface section of the server 3, a printer directly locally connected to the server 3, etc., rather than the document generation apparatus 1.

The units 11 to 13 making up the discard certification output unit 10 as described above are implemented as the computer function in the server 3 executes a predetermined program. In this case, the predetermined program may be stored on a computer-readable storage medium and be provided or may be distributed through wired or wireless communication unit before the program is installed in the server 3. This unit that the discard certification output unit 10 having the functional configuration described above can also be implemented as a document shredding program that can be installed in the server 3.

The units 11 to 13 need not necessarily be placed in the server 3 and may be distributed among the components 1 to 3 in the system. This unit that the discard certification output unit 10 having the configuration described above may be installed in the document generation apparatus 1 or the document discard apparatus 2 or may be distributed among the document generation apparatus 1, the document discard apparatus 2, and the server 3.

Next, processing operation examples in the document discard certification apparatus 10 having the configuration described above will be discussed.

Figure 6:
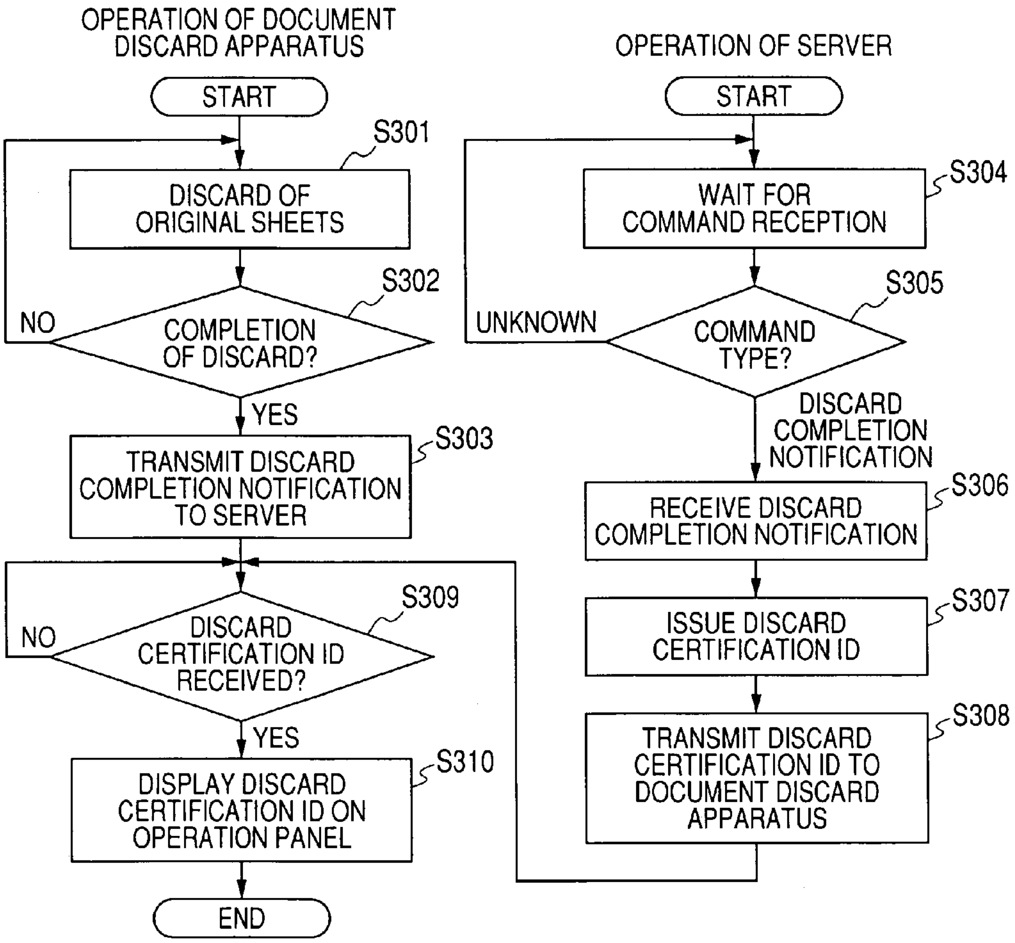

First, the processing operation of the document discard certification apparatus 10 responsive to document discard in the document discard apparatus 2 will be discussed. FIG. 6 is a flowchart to show a processing operation example in the document discard certification apparatus 10 according to the exemplary embodiment of the invention and a processing operation example when a document is disposed of.

As illustrated in the figure, when a document is disposed of, the document discard apparatus 2 repeatedly performs the document discard processing previously described with reference to FIG. 2 as many times as the number of originals set in the document discard apparatus 2 (S301). At this time, if the original to be disposed of is made up of a plurality of sheets, an ADF (Automatic Document Feeder) included in the document discard apparatus 2 can be used to automatically feed the original of a plurality of sheets. Upon completion of the discard processing of all originals set in the document discard apparatus 2 (S302), the document discard apparatus 2 transmits a discard completion notification of a notification that the discard processing is complete to the server 3 having the function of the document discard certification apparatus 10 (S303) It is assumed that the discard completion notification contains the document discard certification information generated by the document discard apparatus 2.

On the other hand, the server 3 as the document discard certification apparatus 10 monitors the presence or absence of a command transmitted to the server 3 (S304). If the type of received command is discard completion notification from the document discard apparatus 2 (S305), the server 3 receives the discard completion notification (S306) and stores the document discard certification information contained in the discard completion notification. Upon reception of the discard completion notification, the server 3 issues discard certification ID in response to the discard completion notification (S307). It is assumed that the document IDs of all documents disposed of in the processing sequence are strung in the discard certification ID. The server 3 transmits the issued discard certification ID to the document discard apparatus 2 transmitting the discard completion notification (S308). At this time, if the mail address of the user making the discard processing request is registered, the discard certification ID can also be transmitted to the mail address by electronic mail.

When thus receiving the discard certification ID transmitted from the server 3 (S309), the document discard apparatus 2 displays the received discard certification ID on a user interface section (operation panel, etc.,) included in the document discard apparatus 2 (S310).

Subsequently, the processing operation of the document discard certification apparatus 10 when outputting a discard certificate will be discussed. Here, the case where a discard certificate is output in the document generation apparatus 1 is taken as an example.

Figure 7:
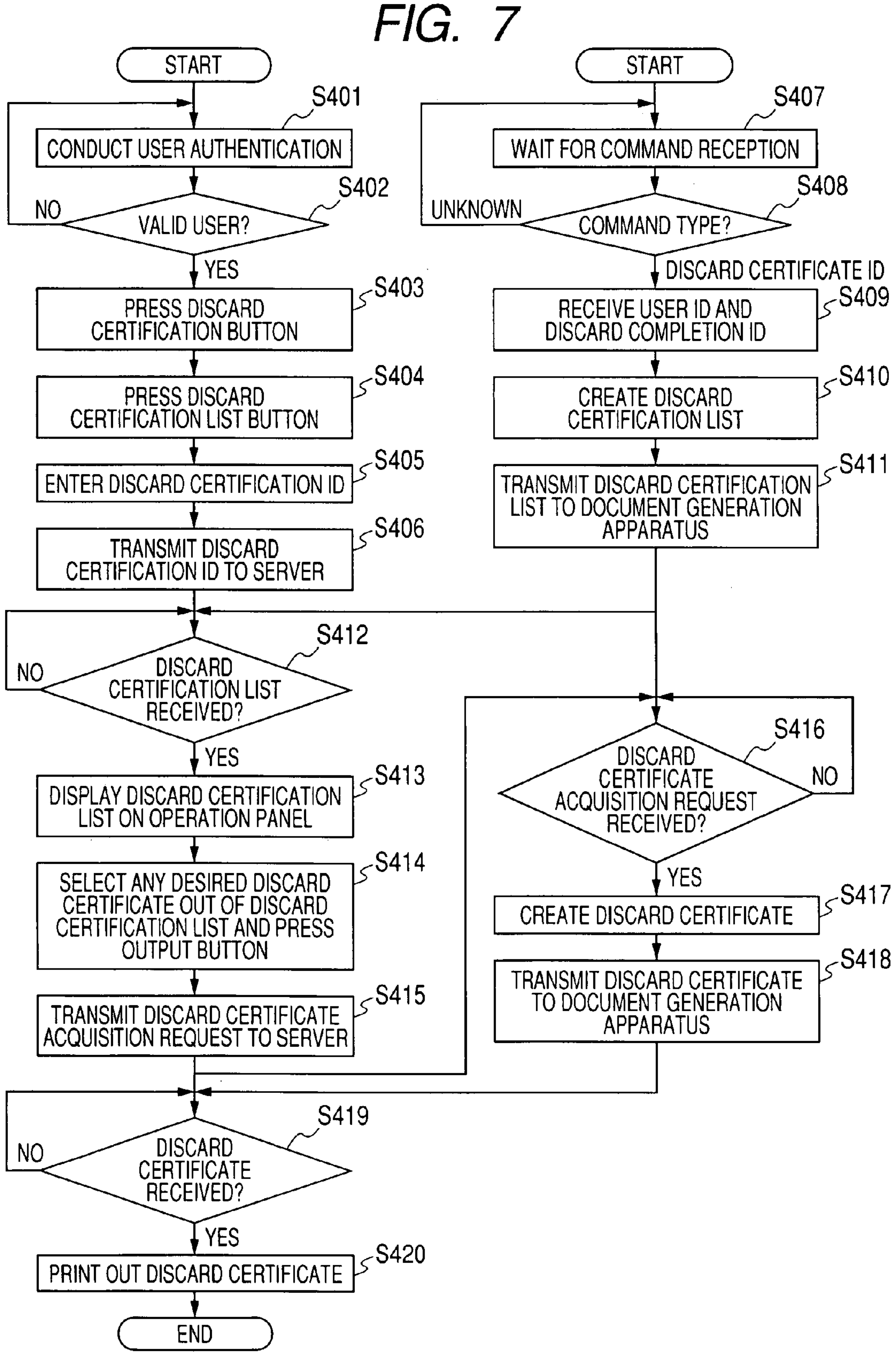
FIG. 7 is a flowchart to show a processing operation example in the document discard certification apparatus according to the exemplary embodiment of the invention and a processing operation example when a discard certificate is output.

FIG. 7 is a flowchart to show a processing operation example in the document discard certification apparatus 10 according to the exemplary embodiment of the invention and a processing operation example when a discard certificate is output. As illustrated in the figure, when a discard certificate is output in the document generation apparatus 1, first the document generation apparatus 1 conducts user authentication using an IC card or a USB key where the digital certificate of the user is stored by the user desiring a discard certificate (S401). Here, the user authentication information may be managed locally or user information may be inquired of the LDAP server for authentication. If the user is valid (S402) as a result of the user authentication, when the user presses a discard certificate button (mode switch button) on a user interface section (operation panel, etc.,) included in the document generation apparatus 1 (S403), the document generation apparatus 1 switches to a discard certificate output mode.

In the discard certificate output mode, if the user presses a discard certification list button (list output request button) on the user interface (S404) and further enters the discard certification ID (sent to the user) (S405), the document generation apparatus 1 transmits the entered discard certification ID together with the user ID acquired through the user authentication to the server 3 having the function of the document discard certification apparatus 10 (S406).

On the other hand, the server 3 as the document discard certification apparatus 10 monitors the presence or absence of a command transmitted to the server 3 (S407). If the type of received command is transmission notification of the discard certification ID from the document discard apparatus 2 (S408), the server 3 receives the discard certification ID and the user ID transmitted from the document generation apparatus 1 (S409). Upon reception of the discard certification ID, the server 3 extracts the document IDs managed in association with the discard certification ID based on the list information corresponding to the discard certification ID and generates a discard certification list (S410). The discard certification list is one piece of the information concerning document discard in the document discard apparatus 2; specifically it is a list of the extracted documents. When generating such a discard certification list, the server 3 transmits the discard certification list to the document generation apparatus 1 transmitting the discard certification ID (S411). At this time, the server 3 transmits the discard certification list as data in a format that can be output as a visible image in the document generation apparatus 1. That is, using a preset model (image data, font data, etc.,), the server 3 outputs the discard certification list to the document generation apparatus 1 as one of discard certification put into a visible image in a predetermined format.

When thus receiving the discard certification list transmitted from the server 3 (S412), the document generation apparatus 1 displays the received discard certification list using the user interface section (operation panel, etc.,) (S413). It is considered that the discard certification list is displayed with a check box given for each of the listed documents.

If the user referencing the displayed discard certification list specifies any desired document (document whose discard certificate output is desired) out of the list and further presses an output button (certificate output request button) on the user interface section (S414), the document generation apparatus 1 transmits a request for acquiring the discard certificate of the specified document to the server 3 as the document discard certification apparatus 10 (S415).

Upon reception of the request for acquiring the discard certificate, transmitted from the document generation apparatus 1 (S416), the server 3 generates a discard certificate of the document whose document ID is determined by the request based on information concerning various attributes certifying discard of the document (see FIG. 4) (S417). The discard certificate is one piece of information concerning document discard in the document discard apparatus 2; specifically it is information enumerating information to determine the fact of discard of the document (information concerning the discard date and time, the discard apparatus, etc.,). When generating such a discard certificate, the server 3 transmits the discard certificate to the document generation apparatus 1 transmitting the discard certificate acquisition request (S418). At this time, the server 3 transmits the discard certificate as data in a format that can be output as a visible image in the document generation apparatus 1. That is, using a preset model (image data, font data, etc.,), the server 3 outputs the discard certificate to the document generation apparatus 1 as one of discard certification put into a visible image in a predetermined format.

When thus receiving the discard certificate transmitted from the server 3 (S419), the document generation apparatus 1 prints out the received discard certificate (S420).

Figure 9A:
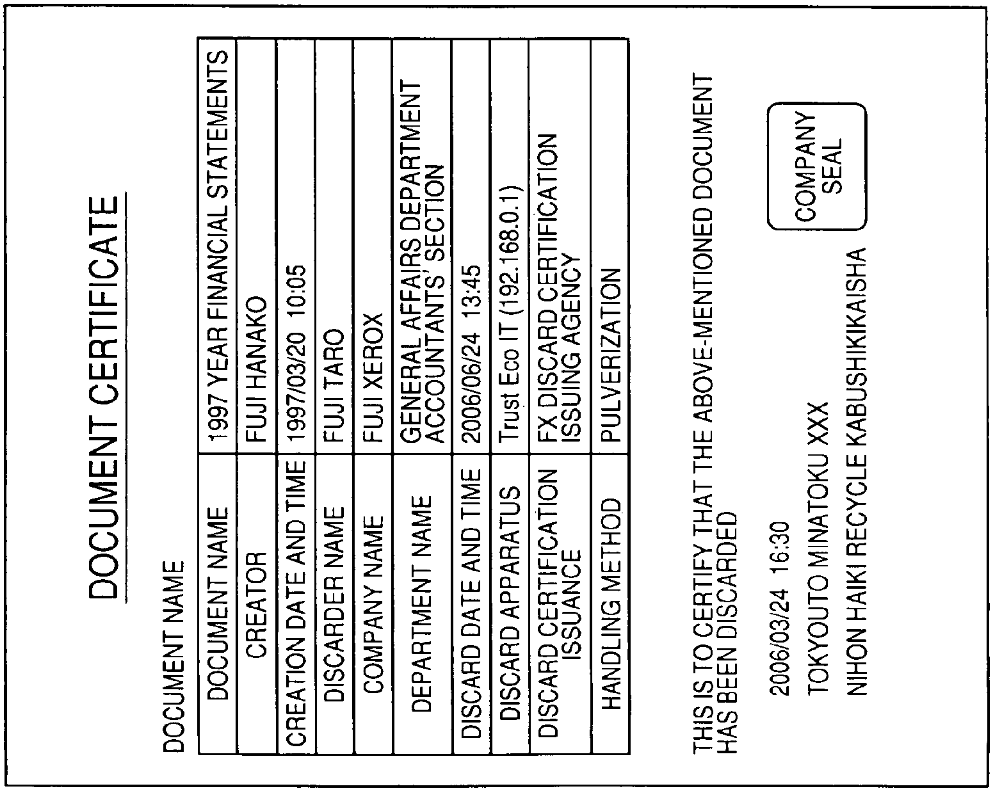
FIGS. 9A and 9B are schematic representations to show specific examples of a discard certificate.
Figure 9B:
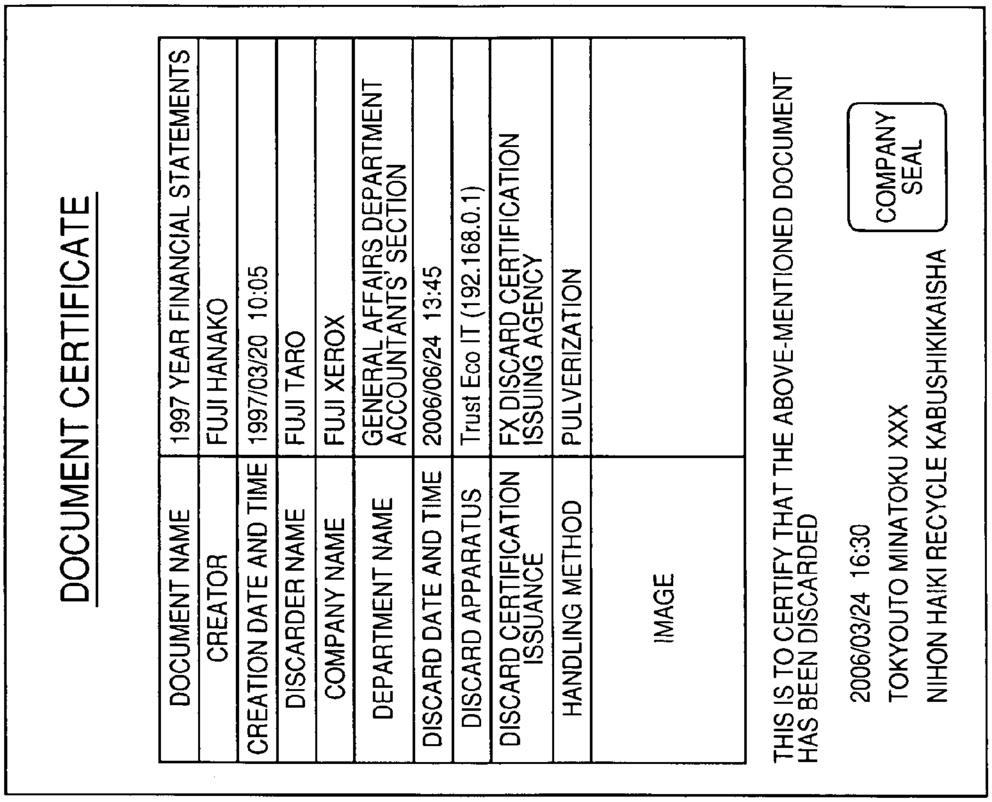

Subsequently, the discard certification output as the processing operation sequence is performed as described above will be discussed with specific examples. FIG. 8 is a schematic representation to show a specific example of the discard certification list and FIGS. 9A and 9B are schematic representations to show a specific example of the discard certificate.

As shown in FIG. 8, the discard certification list is a list of the documents making up the document group disposed of in one process of the document discard. Such a discard certification list may be printed out on record paper rather than displayed on the user interface section (operation panel, etc.,) as described above. In this case, if the user enters a mark in a check box of the discard certification list and the discard certification list in which the mark is entered is read using a scan function of the document generation apparatus 1 and an information request for the discard certificate that can be determined from the read result is transmitted to the server 3, similar processing operation to that of the display described above can be performed.

If the discard certification list is displayed, it is also possible to determine any discard certificate desired by the user using a hyperlink rather than display of the list with a check box given for each of the listed documents. The hyperlink may be formed using a known technology and therefore will not be discussed here.

Further, to display the discard certification list, the following mode is also possible: The discard certification list is made up of the minimum necessary information pieces, a detailed information acquisition button is provided on the operation panel, and when the user presses the detailed information acquisition button, detailed information of discard certification is inquired of the server 3 and display is switched to the detailed information. In so doing, it is made possible to reduce the information amount of the discard certification list and even in the case, it is also made possible for the user to check the detailed information before determining the document to make a request for issuing a discard certificate of the document.

The discard certificate enumerates information to determine the fact of document discard (document name, discard date, etc.,) as shown in FIGS. 9A and 9B. However, the information items enumerated in the discard certificate are not limited and may be set appropriately if the format (model) is predetermined. For example, if information retained and managed by the function of the discard information management unit 12 contains image data to determine the contents of the document disposed of by the document discard apparatus 2, it is possible to output the image onto the discard certificate as shown in FIG. 9B. In this case, if the document is made up of a plurality of pages, the pages may be output as a thumbnail.

However, the discard certificate may be received as an electronic document for use by the document generation apparatus 1 or an apparatus connected thereto rather than printed out onto record paper. In this case, it is also considered that an electronic signature, etc., of a known technology is added for making it possible to make a tampering check. That is, the output mode of the discard certificate is not limited and may be set in response to the situation of the party using the discard certificate.

The discard certification list and the discard certificate as described above can be output. Thus, in the document discard certification system described in the embodiment, when the document discard apparatus 2 disposes of a document, a discard certification list or a discard certificate concerning the document discard is converted into a visible image or is output as printout, image display, etc., so that, for example, even to collectively dispose of a document group made up of a large amount of documents or to request a different enterprise, a different organization, etc., to collectively dispose of a document group made up of a large amount of documents, it is made possible to easily keep track of the description of the discard by referencing the output discard certification list or discard certificate.

Although the invention has been described in its preferred specific examples as the embodiment, it is to be understood that the invention is not limited to the specific embodiment thereof and that changes may be made as required in the invention without departing from the spirit and scope thereof. In the embodiment, the discard certification ID is issued with collective discard processing of documents at a time as one process of document discard by way of example, but may be issued in units of the discard certification attributes of the document creator, the company name, etc. In the embodiment, the user makes a discard certification output request using the document generation apparatus by way of example, but it is also possible for the user to access the document discard certification apparatus 10 from a computer existing on the communication line 4, enter the discard certification ID, and acquire a discard certification list, and request an image formation apparatus to output a discard certificate.

What is claimed is:

1. A discard certification output device which is installed in one of a document generation apparatus generating a document to which first identification information for identifying the document is given, a document discard apparatus discarding the document, and a server connected to the document generation apparatus and document discard apparatus, the discard certification output device comprising:

a discard information acquisition unit that acquires, along with the first identification information, discard certificate information certifying a discard of the document to which the first identification information is given from the document discard apparatus;

a discard information management unit, when the discard information acquisition unit acquires a plurality of discard certificate information for a group of a plurality of documents:

that issues second identification information indicating a collective operation which discards the group of the plurality of documents in a series of operations, that stores list information organizing the second identification information and a plurality of first identification information of the plurality of documents forming said group, and that stores the list information and the plurality of discard certificate information in association with each other; and a discard certification output unit, in a case where the discard certification output device receives the second identification information, that converts the discard certificate information acquired by the discard information acquisition unit into a visible image in a predetermined format based on the list information correlated with the received second identification information by the discard information management unit and outputs the visible image as a discard certification list.

2. The discard certification output device as claimed in claim 1, wherein the discard certification output unit outputs the discard certification list by printing onto record paper.

3. The discard certification output device as claimed in claim 1, wherein the second identification information includes a discard certification ID.

4. A computer-implemented method for outputting a discard certificate comprising:

acquiring first identification information along with discard certificate information certifying a discard of a document to which the first identification information is given;

when a plurality of discard certificate information for a group of a plurality of documents has been acquired:

issuing second identification information indicating a collective operation which discards the group of the plurality of documents in a series of operations, storing list information organizing the second identification information and a plurality of first identification information of the plurality of documents forming said group, and storing the list information and the plurality of discard certificate information in association with each other;

in a case where the second identification information is received, converting the discard certificate information acquired into a visible image in a predetermined format based on the list information correlated with the received second identification information; and outputting the visible image as a discard certification list.

5. The computer-implemented method for outputting a discard certificate as claimed in claim 4, wherein the second identification information includes a discard certification ID.

6. A non-transitory computer readable medium storing a program causing a computer to execute a process for outputting a discard certificate, the process comprising:

acquiring first identification information along with discard certificate information certifying a discard of a document to which the first identification information is given;

when a plurality of discard certificate information for a group of a plurality of documents has been acquired:

issuing second identification information indicating a collective operation which discards the group of the plurality of documents in a series of operations, storing list information organizing the second identification information and a plurality of first identification information of the plurality of documents forming said group, and storing the list information and the plurality of discard certificate information in association with each other;

in a case where the second identification information is received, converting the discard certificate information acquired into a visible image in a predetermined format based on the list information correlated with the received second identification information; and outputting the visible image as a discard certification list.

7. The non-transitory computer readable medium storing a program causing a computer to execute a process for outputting a discard certificate as claimed in claim 6, wherein the second identification information includes a discard certificate ID.

8. A discard certification output device which is installed in one of a printer generating a document to which first identification information for identifying the paper is given and which is a paper on which a given image is printed, a shredder discarding the document, and a server connected to the printer and the shredder, the discard certification output device comprising:

a discard information acquisition unit that acquires, along with the first identification information, discard certificate information certifying a discard of the document to which the first identification information is given from the shredder;

a discard information management unit, when the discard information acquisition unit acquires a plurality of discard certificate information for a group of a plurality of documents:

that issues second identification information indicating a collective operation which discards the group of the plurality of documents in a series of operations, that stores list information organizing the second identification information and a plurality of first identification information of the plurality of documents forming said group, and that stores the list information and the plurality of discard certificate information in association with each other; and a discard certification output unit, in a case where the discard certification output device receives the second identification information, that converts the discard certificate information acquired by the discard information acquisition unit into a visible image in a predetermined format based on the list information correlated with the received second identification information by the discard information management unit and outputs the visible image as a discard certification list.

* * * * *